(12) United States Patent
Brekken et al.

(10) Patent No.: US 7,435,043 B2
(45) Date of Patent: Oct. 14, 2008

(54) AIR CARGO VERTICAL RESTRAINT ASSEMBLY

(75) Inventors: Gregory Albert Brekken, Jamestown, ND (US); Rodney Orland Niemeier, Jamestown, ND (US); Wallace Harold Larson, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 453 days.

(21) Appl. No.: 11/249,742

(22) Filed: Oct. 14, 2005

(65) Prior Publication Data

US 2007/0086871 A1    Apr. 19, 2007

(51) Int. Cl.
*B60P 7/08* (2006.01)
(52) U.S. Cl. .......................................... 410/69; 410/80
(58) Field of Classification Search .................. 410/69, 410/77, 80, 94; 244/118.1, 137.1; 248/500
See application file for complete search history.

(56) References Cited

U.S. PATENT DOCUMENTS

| | | | |
|---|---|---|---|
| 3,741,504 A | 6/1973 | Alberti et al. | |
| 4,583,896 A * | 4/1986 | Vogg et al. | ............. 410/69 |
| 5,011,348 A | 4/1991 | Jensen | |
| 5,486,077 A | 1/1996 | Nutting | |
| 5,692,862 A | 12/1997 | Hilde | |
| 6,039,519 A | 3/2000 | Jones et al. | |
| 6,270,300 B1 | 8/2001 | Huber et al. | |

OTHER PUBLICATIONS

Search Report, GB0719890.6, issued Nov. 9, 2007.
Search Report, GB0619604.2, issued Nov. 1, 2007.

* cited by examiner

*Primary Examiner*—Stephen Gordon
(74) *Attorney, Agent, or Firm*—Womble Carlyle (57) ABSTRACT

A vertical restraint and guide rail assembly includes a number of features which individually, or collectively, may be implemented to enhance performance. One such feature is a vertical restraint head whose forwardmost point is laterally offset from a longitudinal axis A that passes through the pivot point. A second feature is a vertical restraint head having radiused bottom surface, the lowest point of the bottom surface being aligned with the longitudinal axis A even though the forwardmost point of the vertical restraint head is laterally offset from this axis. Another feature is a pair of stops formed on the housing in which the shaft of the vertical restraint member is rotatably mounted. The stops limit rotation of the vertical restraint member to thereby reduce fatigue or hysteresis of the spring mechanism that provides a resisting force when the vertical restraint member has been deflected in either rotational direction. Yet another feature is a pair of spaced apart spring actuation bosses formed on an inner side wall of a housing bore, the spring actuation bosses comprising circumferential abutment surfaces which serve as stops for opposing side edges of a leaf spring.

33 Claims, 12 Drawing Sheets

AIR CARGO VERTICAL RESTRAINT ASSEMBLY

CROSS REFERENCE TO RELATED APPLICATIONS

None.

BACKGROUND OF THE INVENTION

The present invention is related to a vertical restraint of the sort attached to a guide rail mounted on a floor of an aircraft cargo compartment.

One of the challenges confronting operators of freighter aircraft is efficiently handling cargo to be transported by the aircraft. Early freighters used manual labor to load and unload cargo. The loading and unloading operation has been improved dramatically by using large cargo containers designed to fit within the space limitations of an aircraft cargo compartment. Many items of freight headed for a single destination are loaded into a single container and then transported to the aircraft as a single unit rather than being transported as individual items of freight.

Aircraft cargo handling systems have been developed to move these cargo containers once they have been transported to the aircraft. For example, the cargo compartment deck surface may be equipped with ball bearing rollers to facilitate flight line workers moving pallets and containers resting on the rollers across the cargo deck surface manually. Some aircraft are equipped with powered mechanisms having friction rollers that provide the force to move the loaded cargo containers from the cargo compartment door to the place in the cargo compartment where they will be secured for the duration of the flight.

These powered cargo container handling systems require some means of guiding the heavy cargo containers to their proper destination in the cargo compartment, while preventing them from striking the side walls of the aircraft and possibly doing structural damage as they are being loaded or unloaded. Usually a system of stops serves to guide cargo containers and prevent them from striking aircraft side wall structure.

Because aircraft fuselages are not always the same width from the front of the cargo compartment to the rear, or because some cargo spaces in aircraft cargo compartments occupy less than the entire width of the aircraft, some cargo containers are wider than others. For a single cargo loading and unloading system to accommodate all widths of cargo containers, more than one set of cargo container guide stops may be required in the same area of the cargo compartment. Cargo containers of different widths are usually loaded in batches of a particular width until the area of the cargo compartment intended for receiving such cargo containers is full. When wide cargo containers are being loaded, the guide stops intended to accommodate narrower cargo containers are retracted into the cargo deck surface or removed so as not to interfere with passage of wider containers.

If a guide stop for narrow containers is inadvertently left in place, it is in danger of being struck by a heavily loaded cargo container when the loading operation switches to the wider containers. When struck directly by a fully loaded cargo container weighing several thousand pounds, and especially if propelled by a powered roller system, these stops themselves can be damaged, but more importantly, can transmit the impact force to the cargo deck surface to which they are attached, damaging it as well. Damage to the cargo container (and sometimes, to the cargo therein) can occur as a result of such forceful contact.

Air cargo operators need a means of guiding such cargo containers that will reliably guide the containers to their proper locations in the cargo compartment, but that will not transmit damaging forces to the cargo deck surface if accidentally struck directly by a heavy cargo container.

Figure 1A:
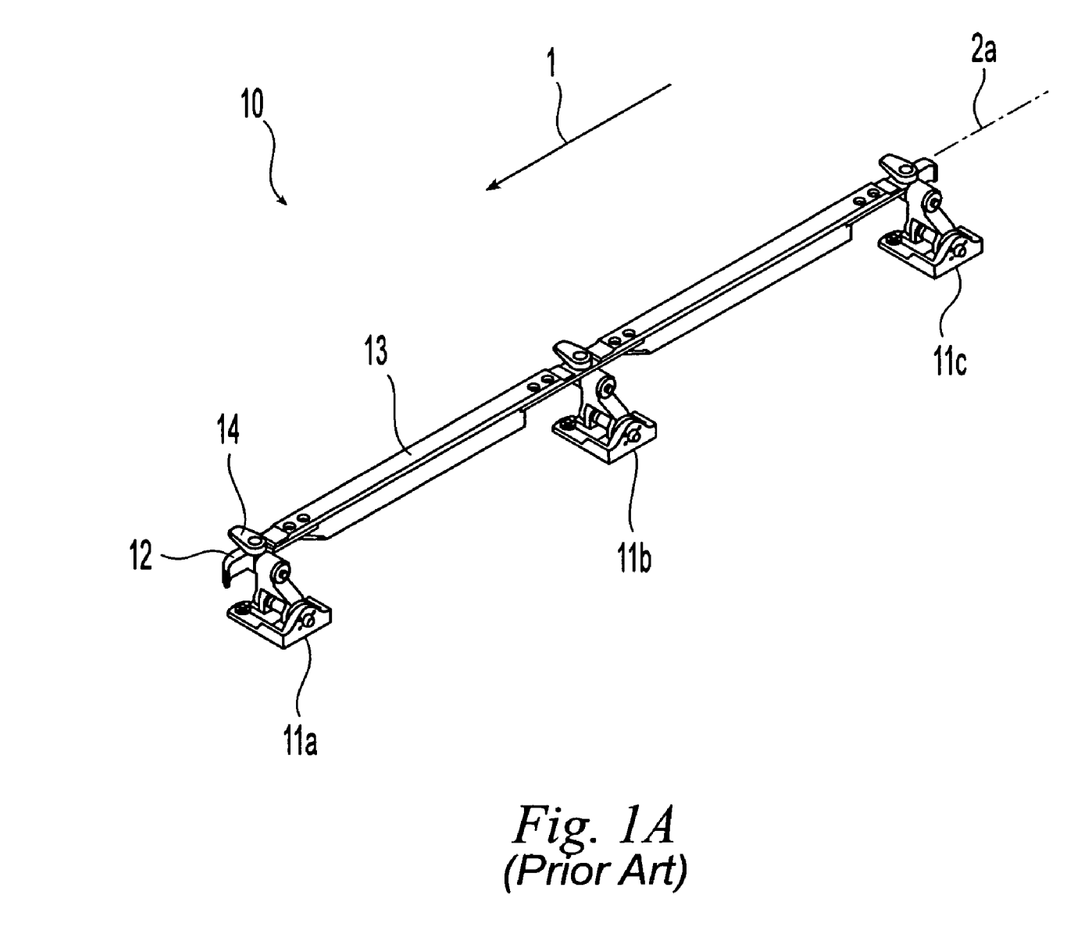
FIG. 1A shows a prior art vertical restraint and guide rail assembly including the retracting rail supports.

U.S. Pat. No. 5,692,862 shows a cargo system suitable for this purpose. FIG. 1A, taken from FIG. 1 of the '862 patent, shows a guide rail and support assembly 10 with its longitudinal axis 2a parallel with the preferred direction of cargo container movement 1. Guide rail and support assembly 10 is comprised of a plurality of retracting rail supports 11a, 11b, and 11c. Of course, any number of retracting rail supports could be used, depending upon the desired length of guide rail and support assembly 10. Guide rail 13 links together the retracting rail supports 11a, 11b and 11c.

Guide rail and support assembly 10 typically has a rail end fitting 12 at each end to serve as a bumper to absorb impact from collisions with cargo containers, and to regain guidance of cargo containers as the cargo containers pass from one guide rail to the next. Also mounted on guide rail and support assembly 10 are a plurality of vertical restraints 14, one positioned at each retracting rail support position. The function of vertical restraint 14 is to allow cargo containers being transported across the cargo deck surface of an aircraft to pass by vertical restraint 14 in either direction along guide rail 13, but to be restrained from moving in the vertical direction. Vertical restraint 14 engages a recess on the cargo container to restrain it from moving vertically, but does not restrain it from moving horizontally. Vertical restraint 14 pivots in either the clockwise or counterclockwise directions to avoid restraining horizontal movement.

Figure 1B:
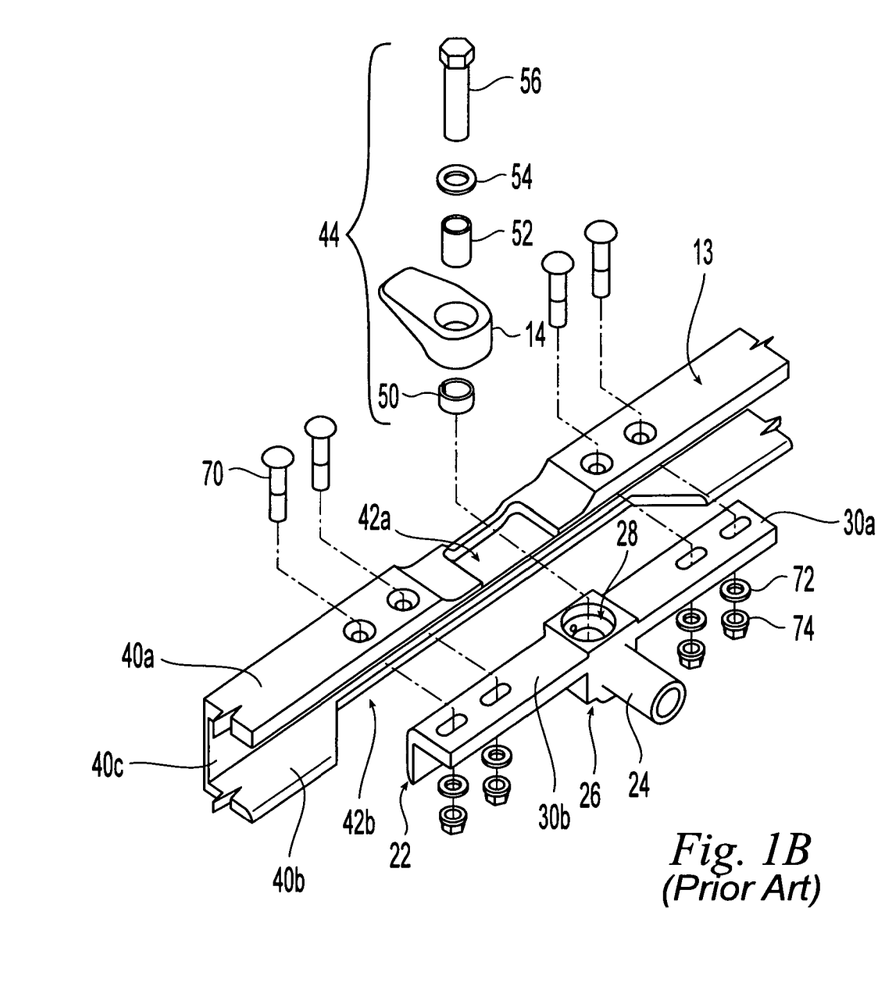
FIG. 1B shows an exploded view of a single prior art vertical restraint assembly.

FIG. 1B shows an exploded view of a prior art vertical restraint and guide rail assembly. As seen in FIG. 1B, the vertical restraint and guide rail assembly includes a vertical restraint support bracket 22, sometimes referred to in the industry as a 'rail fitting'. The prior art vertical restraint support bracket 22 comprises a handle member 24 configured to connect to a retracting rail support, a housing 26 provided with a compartment 28, and support wings 30A, 30B for securing the vertical restraint support bracket 22 to the guide rail 13.

The guide rail 13 comprises an upper leg 40A, a lower leg 40B and a cross-member 40C connecting the two. The guide rail 13 has an upper cutout 42A in the upper leg 40A that is centered over a larger, lower cutout 42B formed in the lower leg 40B. Bolts 70 are used in conjunction with washers 72 and nuts 74 to secure the vertical restraint support bracket 22 to the guide rail 13.

The vertical restraint assembly 44 includes a vertical restraint member 14, a leaf spring 50, a spacer member 52, a washer 54 and threaded bolt 56. These items are partially, or wholly, received into a bore 28. The upper portion of the bore 28 has a first, larger diameter, and the lower portion of the bore comprises a tapped hole into which the threaded end of the threaded bolt 56 is inserted. An annular ledge is present between the upper portion of the bore 28 and the lower portion. A spring pin is inserted into a hole formed in the ledge. This spring pin serves as an abutment against which facing edges of the leaf spring 50 abut, when the vertical restraint member 14 is in the neutral position. The vertical restraint member 14 has a downwardly extending arm (not shown) descending from a portion of its front flipper. When the vertical restraint member 14 is rotated in either direction, this downwardly extending arm abuts one or the other of the facing edges of the leaf spring 50, and forces apart the edges, thereby creating a resisting force that tends to return the vertical restraint member 14 to its original, neutral position.

SUMMARY OF THE INVENTION

The present invention is directed to improvements in a prior art assembly of the sort seen in FIG. 1B.

In one aspect, the present invention is directed to a first air cargo vertical restraint assembly. The inventive assembly includes a vertical restraint support bracket which comprises a handle member having a handle axis (H) and a housing connected to the handle member. The housing comprises an upper surface having an upper opening therein, the upper opening leading to a housing bore extending along a housing bore axis (T). A rear portion of the housing upper surface is provided with a pair of spaced apart stops and a side wall of the housing bore is provided with a pair of spaced apart bosses. The inventive assembly also includes a vertical restraint member which comprises a head portion having a first longitudinal axis (A) and a shaft connected to the head portion, the shaft having a second longitudinal axis (S) that intersects the first longitudinal axis. The head portion has a forwardmost portion that is laterally offset from the first longitudinal axis. In a front view, a bottom surface of the head portion is convex, symmetrically curved about the first longitudinal axis and has a lowest point that is horizontally aligned with said first longitudinal axis. The vertical restraint member is configured to be received into the housing bore of the vertical restraint support bracket.

In one aspect, the present invention is directed to a second air cargo vertical restraint assembly. This inventive assembly again includes a vertical restraint support bracket which comprises a handle member having a handle axis (H) and a housing connected to the handle member. The housing comprises an upper surface having an upper opening therein, the upper opening leading to a housing bore extending along a housing bore axis (T). A rear portion of the housing upper surface is provided with a pair of spaced apart stops and a side wall of the housing bore is provided with a pair of spaced apart bosses. The inventive assembly also includes a vertical restraint member which comprises a head portion having a first longitudinal axis (A) and a shaft connected to the head portion, the shaft having a second longitudinal axis (S) that intersects the first longitudinal axis. Again, the vertical restraint member is configured to be received into the housing bore of the vertical restraint support bracket.

In yet another aspect, the present invention is directed to a first air cargo vertical restraint member comprising a head portion having a first longitudinal axis (A), a shaft connected to the head portion, the shaft having a second longitudinal axis (S) that intersects the first longitudinal axis. The inventive aspects of this air cargo vertical restraint member include a head portion that has a forwardmost portion that is laterally offset from the first longitudinal axis.

In yet another aspect, the present invention is directed to a second air cargo vertical restraint member comprising a head portion having a first longitudinal axis (A), a shaft connected to the head portion, the shaft having a second longitudinal axis (S) that intersects the first longitudinal axis. The inventive aspects of this air cargo vertical restraint member include features associated with the bottom surface of the head portion. Specifically, in a front view, the bottom surface of the head portion is convex, symmetrically curved about the first longitudinal axis and has a lowest point that is horizontally aligned with said first longitudinal axis.

In still another aspect, the present invention is directed to a first air cargo vertical restraint support bracket. This bracket comprises a handle member having a handle axis (H) and a housing connected to the handle member. The housing comprises an upper surface having an upper opening therein, the upper opening leading to a housing bore extending along a housing bore axis (T). A rear portion of the housing upper surface is provided with a pair of spaced apart stops.

In still another aspect, the present invention is directed to a second air cargo vertical restraint support bracket. This bracket comprises a handle member having a handle axis (H) and a housing connected to the handle member. The housing comprises an upper surface having an upper opening therein, the upper opening leading to a housing bore extending along a housing bore axis (T). A side wall of the housing bore is provided with a pair of spaced apart bosses. The pair of bosses and the side wall of the housing bore may have unitary construction.

DETAILED DESCRIPTION OF THE INVENTION

The contents of aforementioned U.S. Pat. No. 5,692,862 are incorporated by reference to the extent necessary to understand the present invention.

Figure 2:
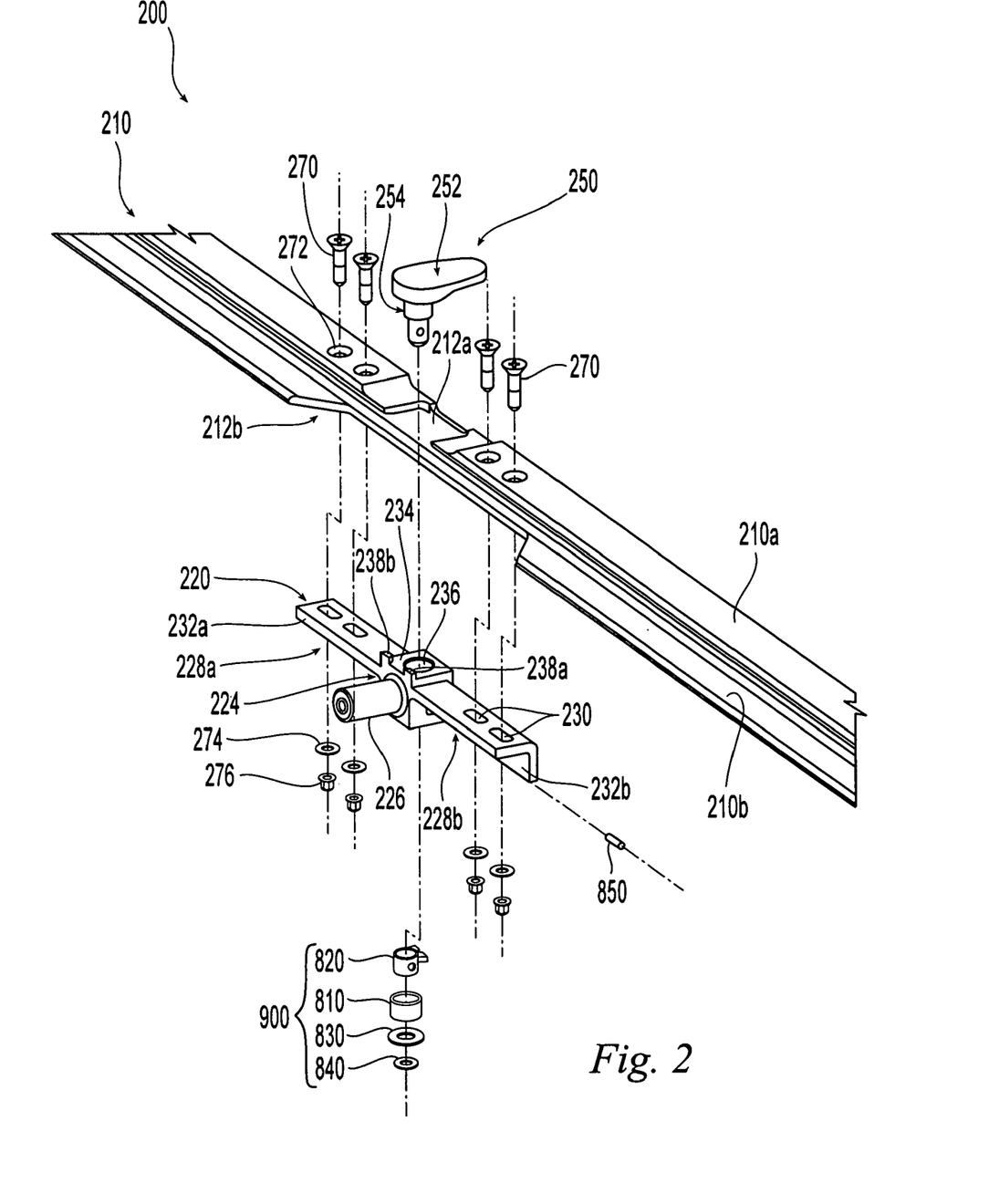
FIG. 2 shows an exploded view of a vertical restraint and guide rail assembly in accordance with the present invention.
Figure 3:
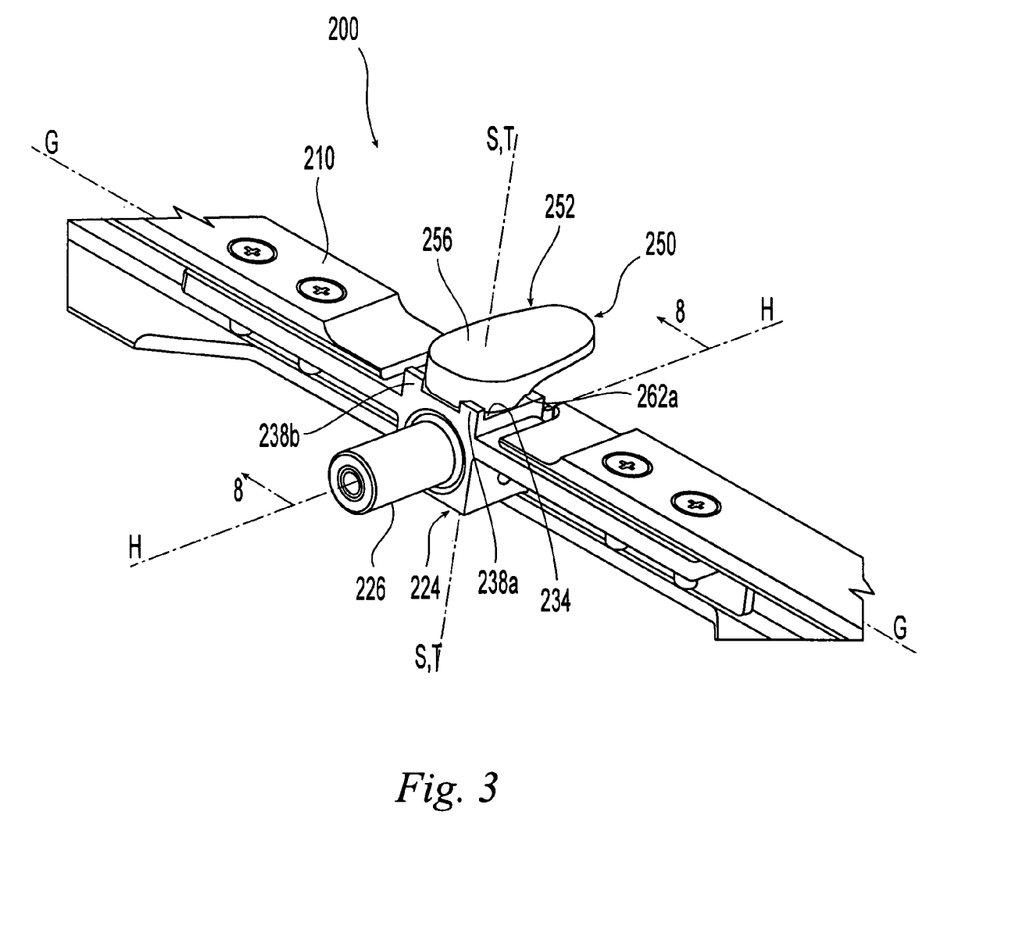
FIG. 3 shows an assembled view of a vertical restraint and guide rail assembly in accordance with the present invention.

FIG. 2 shows an exploded view, and FIG. 3 shows an assembled view of a vertical restraint and guide rail assembly 200 in accordance with the present invention. The retracting rail support has been omitted for simplicity in these two figures, it being understood that a variety of such retracting rail supports may be used in conjunction with the present invention, so long as they are appropriately mated to guide rail assembly 200 (or its handle member 226). Also, only a portion of the guide rail assembly is shown, it being understood that the structures described below may be repeated along the length of the guide rail.

The assembly 200 comprises a guide rail 210, one or more vertical restraint support brackets 220, and a vertical restraint member 250 associated with each vertical restraint support bracket 220.

The guide rail 210 has a U-shaped cross-section with an upper leg 210A, a lower leg 210B and a cross member connecting the two. The upper leg 210A of the guide rail 210 is interrupted by an upper cutout 212A and the lower leg 210B of the guide rail 210 is interrupted by a lower cutout 212B. As seen in FIG. 2, the lower cutout 212B is wider than the upper cutout 212A, and the upper cutout 212A is directly above a center portion of the lower cutout 212B. The legs 210A, 210B are sufficiently spaced apart to receive the front end of the vertical restraint support bracket 220 between the upper and lower legs 210A, 210B, at a point proximate the upper and lower cutouts 212A, 212B.

The vertical restraint support bracket 220 is fastened to the guide rail 210 by one or more bolts 270 on either side of the upper cutout 212A. The bolts 270 pass through bolt holes 272 formed in the upper leg 210A and are secured by washers 274 and nuts 276.

In one embodiment, the vertical restraint support bracket 220 is machined from a single block of stainless steel and therefore has unitary, i.e., "single piece", construction. It is understood, however, that the vertical restraint support bracket 220 may be formed from other materials and need not necessarily have unitary construction. The vertical restraint support bracket 220 comprises a housing 224, a handle member 226 extending in a rearward direction from the housing 224 along a longitudinal handle axis H, and first and second securing wings 228A, 228B extending from opposite lateral sides of the housing 224 along a guide rail axis G which extends in a direction perpendicular to that of the handle's longitudinal axis H. As best seen in FIG. 3, the housing 224 is positioned along the handle axis H.

Each of the securing wings 228A, 228B has an L-shaped cross-section comprising an upwardly facing first leg 232A joined to a forwardly facing second leg 232B. The upwardly facing first leg 232A of each securing wing 228A, 228B is provided with one or more apertures 230 and the bolts 270 which secure the vertical restraint support bracket 220 to the guide rail 210 pass through these apertures 230. The forwardly facing second leg 232B of each securing wing has a height that is sufficiently small for insertion in the spacing between the upper and lower legs 210A, 210B. Thus, a forwardly facing surface of the forwardly facing second leg 232B faces a rearwardly facing surface of the connecting member that extends between the upper leg 210A and the lower leg 210B. In other words, the housing 224 is secured into the U-shaped channel of the guide rail 210 by the bolts 270.

The housing 224 has an upper surface 234 in which an upper opening 236 is formed. The upper surface 234 thus defines a perimeter around the upper opening 236. The upper opening 236 leads to a housing bore 237 having a housing bore axis T. Housing bore axis T extends through the housing 224 in a direction perpendicular to both the guide axis G and the handle axis H.

At a rear portion of the housing's upper surface 234, on either side of the handle member 226, are a pair of spaced apart, upwardly projecting stops 238A, 238B. The upwardly projecting stops 238A, 238B are configured to limit rotation of the vertical restraint member 250, as discussed further below.

In one embodiment, the vertical restraint member 250 is machined from a single block of stainless steel and therefore has unitary construction. It is understood, however, that the vertical restraint member 250 may be formed from other materials and need not necessarily have unitary construction.

Figure 4A:
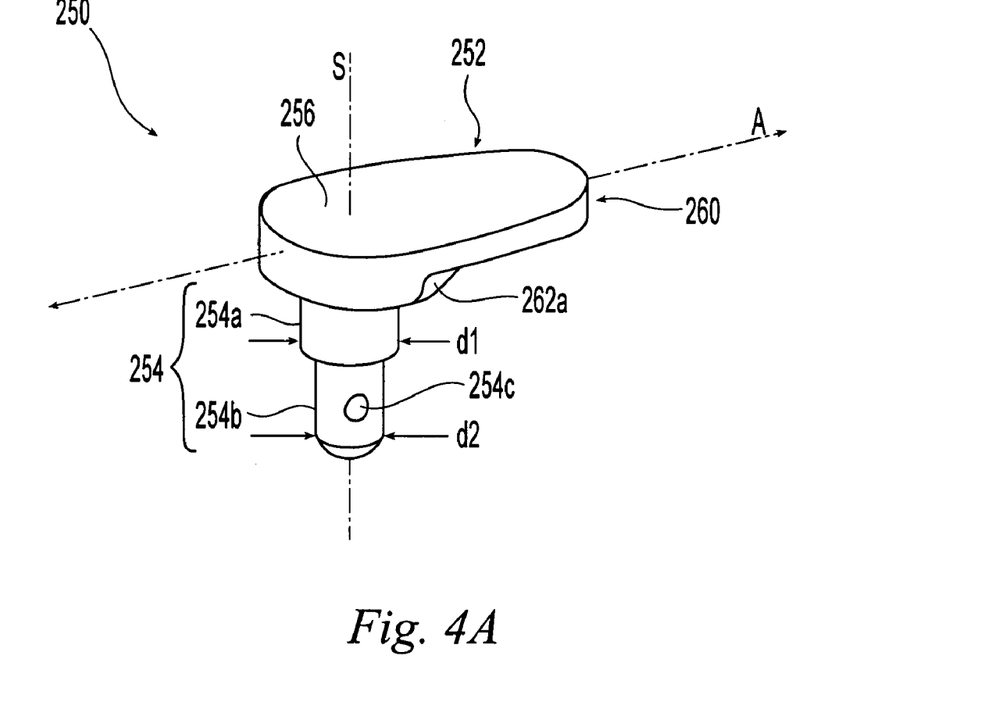
FIG. 4A shows a detailed perspective view of a vertical restraint member in accordance with the present invention, from above.
Figure 4B:
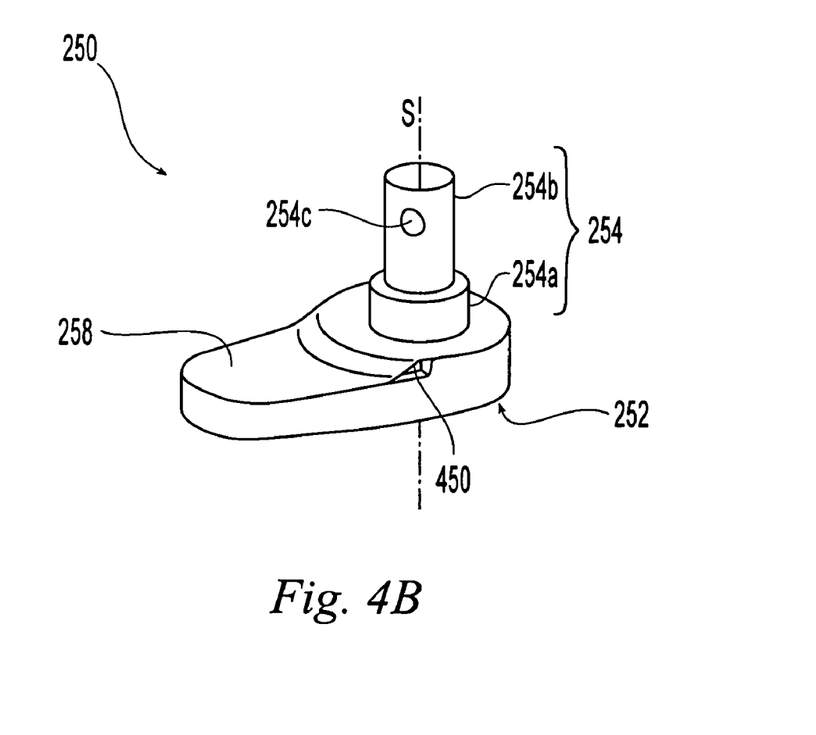
FIG. 4B shows a detailed perspective view of a vertical restraint member in accordance with the present invention, from below.
Figure 5:
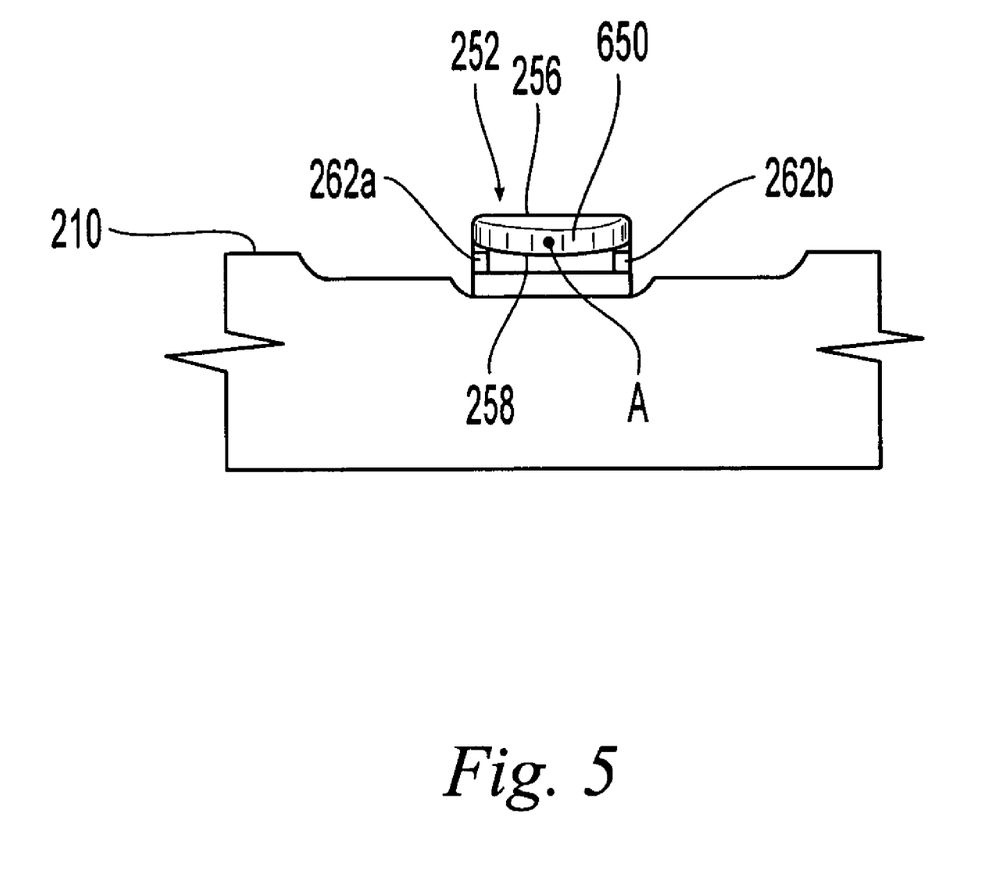
FIG. 5 shows a front view of the vertical restraint member of FIG. 4.

As seen in FIGS. 4A, 4B and 5, the vertical restraint member 250 comprises an elongated restraint head 252 connected to a restraint shaft 254. The restraint shaft 254, which has a longitudinal shaft axis S, comprises a cylindrical base portion 254A connected to, and coaxial with, a cylindrical stem portion 254B. The cylindrical base portion 254A has a first diameter d1 that is larger than a second diameter d2 of the cylindrical stem portion 254B. As seen in the Figures, the cylindrical stem portion 254B has a bore 254C extending therethrough which is oriented substantially perpendicularly to both the longitudinal shaft axis S and also to a longitudinal axis A of the elongated restraint head 252.

The elongated restraint head 252 has a planar upper surface 256, a convexly rounded bottom surface 258, and a peripheral side surface 260.

On its underside, on either side of the shaft 254, the restraint head 252 is provided with a pair of cutouts 262A, 262B. The cutouts 262A, 262B each comprise at least one laterally facing abutment wall 450 (see FIG. 4B) configured and dimensioned to abut a forwardly directed wall 688A, 688B of respective upwardly projecting stops 238A, 238B (FIG. 6A) to limit rotation of the vertical restraint member 250.

Figure 6A:
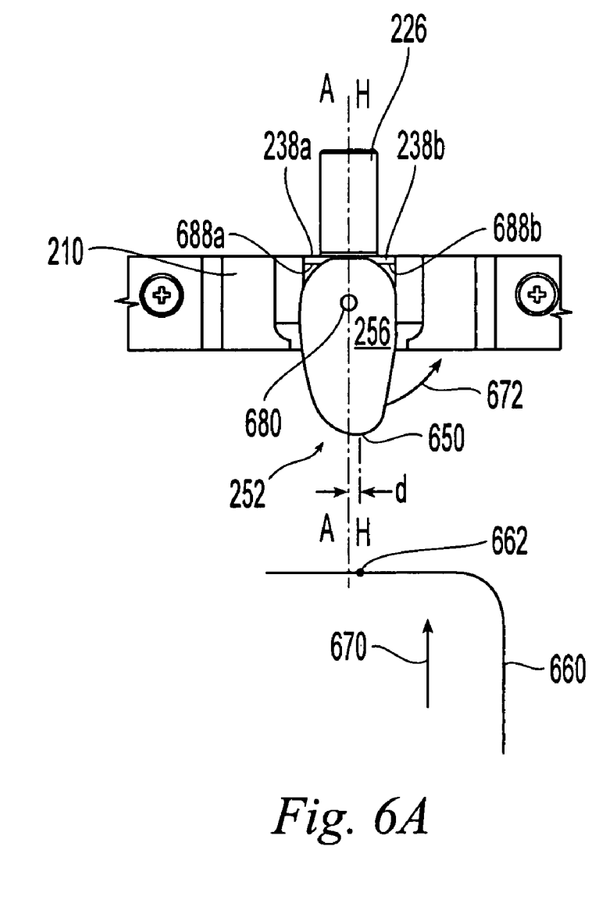
FIGS. 6A and 6B show a top view of the assembled vertical restraint and guide rail assembly of FIG. 3 in the neutral position and in the deflected position, respectively.

When the vertical restraint member 250 rotates to a predetermined position in the clockwise direction (as viewed from above), the right-side upwardly projecting stop 238A passes under a right-side edge of the restraint head 252, enters into the right-side cutout 262A, and abuts a laterally facing abutment wall 450 of the right-side cutout 262A. This abutment arrests further rotation of the elongated restraint head 252 in the clockwise direction. Similarly, when the vertical restraint member 250 rotates sufficiently far in the counter-clockwise direction (again, as viewed from above), the left-side upwardly projecting stop 238B passes under a left-side edge of the restraint head 252, enters into the left-side cutout 262B, and abuts a laterally facing abutment wall 450 of the left-side cutout 262B.

By limiting the rotation of the vertical restraint member 250, the stops 238A, 238B help prevent fatigue or hysteresis of the spring mechanism that provides a resisting force to the vertical restraint member 250 when the latter has been deflected in either rotational direction. This helps ensure that the vertical restraint member 250 returns to the neutral position, the neutral position being defined as the position in which longitudinal axis A of the vertical restraint member 250 is aligned with the longitudinal axis H of the handle member 226.

As seen in FIG. 6A, the top surface 256 of the restraint head 252 does not exhibit bilateral symmetry about the longitudinal axis A, but instead is asymmetric about the longitudinal axis A. Furthermore, when the restraint head 252 is in the neutral position, its forwardmost portion 650 is offset from the longitudinal axis A by a small distance d. The distance d generally depends on the length of the restraint head 252. In one embodiment, this distance d may range from $\frac{1}{25}$ to $\frac{1}{8}$ of the length of the restraint head 252 along the longitudinal axis A.

As seen in FIG. 6A, when a cargo container, or unit load device (ULD) 660 travels head-on towards the restraint head 252 in the direction indicated by the straight arrow 670, the leading end 662 of the ULD 660 first strikes the restraint head 252 at the latter's forwardmost portion 650. This causes the restraint head 252 to rotate about its pivot point 680 in the direction shown by the curved arrow 672. As a consequence, the restraint head 252 rotates to the position seen in FIG. 6B.

Figure 6B:
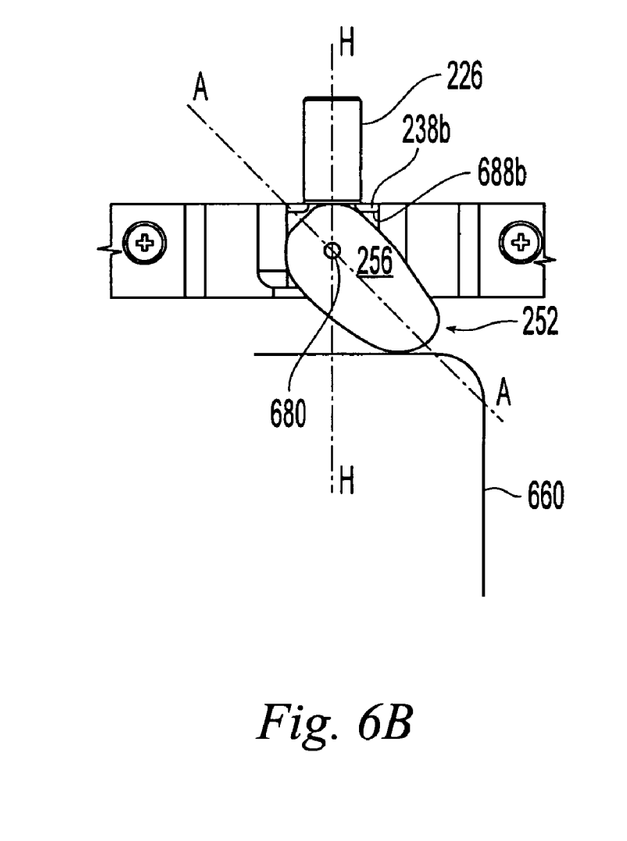

Thus, when the ULD 660 impacts the vertical restraint member 250, the offset contact point 650 causes the vertical restraint member 250 to rotate out of the way. This rotation, facilitated by the construction of the restraint head 252, results in less stress on the shaft 254, as compared to a restraint head without such an offset configuration.

If the ULD 660 has sufficient initial velocity along the direction of the handle axis H, the restraint head 252 will be rotated until a lateral abutment wall of the cutout 262B strikes the forwardly directed wall 688B of the upwardly projecting stop 238B, thereby arresting further rotation of the restraint head 252 and thus, arresting movement of the ULD 660 in the direction of axis H.

As seen in FIG. 5, the bottom surface 258 of the restraint head 252 is convex and radiused. More significantly, in a front view of the restraint head, the bottom surface 258 is convex, symmetrically curved about the longitudinal axis A and has a lowest point that is horizontally aligned with the longitudinal axis A. Thus, even though the forwardmost point 650 of the restraint head 252 is offset from the longitudinal axis A, the radius of curvature of the bottom surface 258 is centered about longitudinal axis A. This allows a vertical load from a ULD to remain centered with the pivot point 680, when a flange of such a ULD is under the vertical restraint member 250. The symmetric underside radius of the restraint head 252 thus helps keep the vertical load path along a line close to the centerline of the shaft 254, thereby reducing the bending stress in the shaft 254 while still restraining the ULD during a flight.

Figure 7:
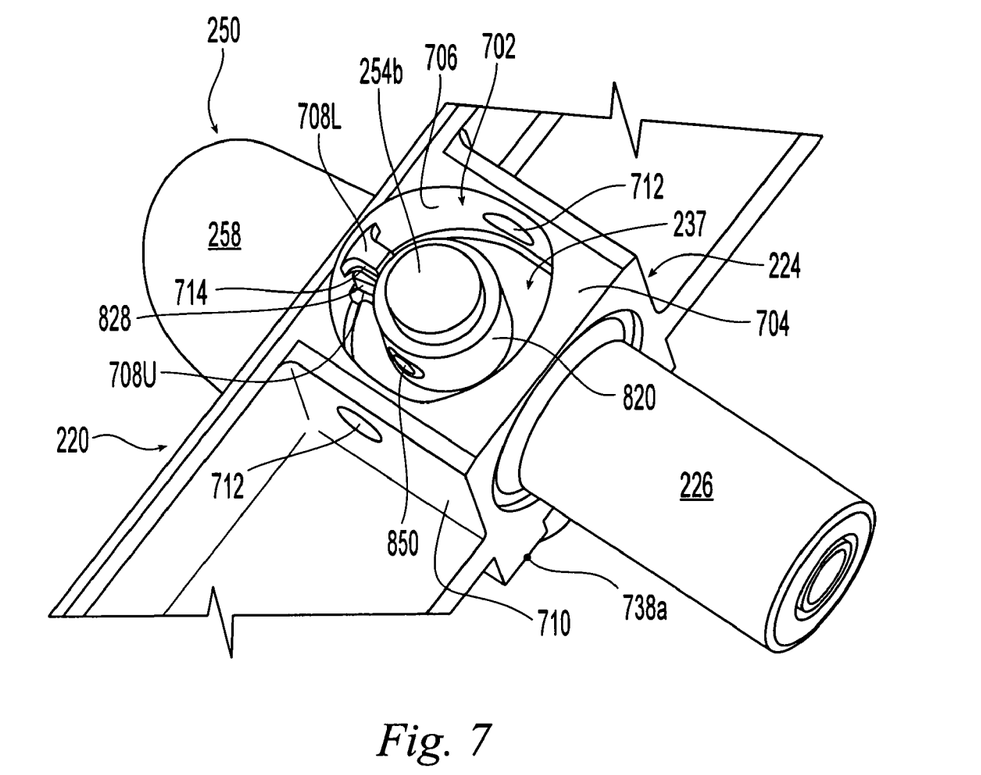
FIG. 7 shows a bottom view of a partially assembled vertical restraint and guide rail assembly presenting the leaf spring actuator in position.
Figure 8:
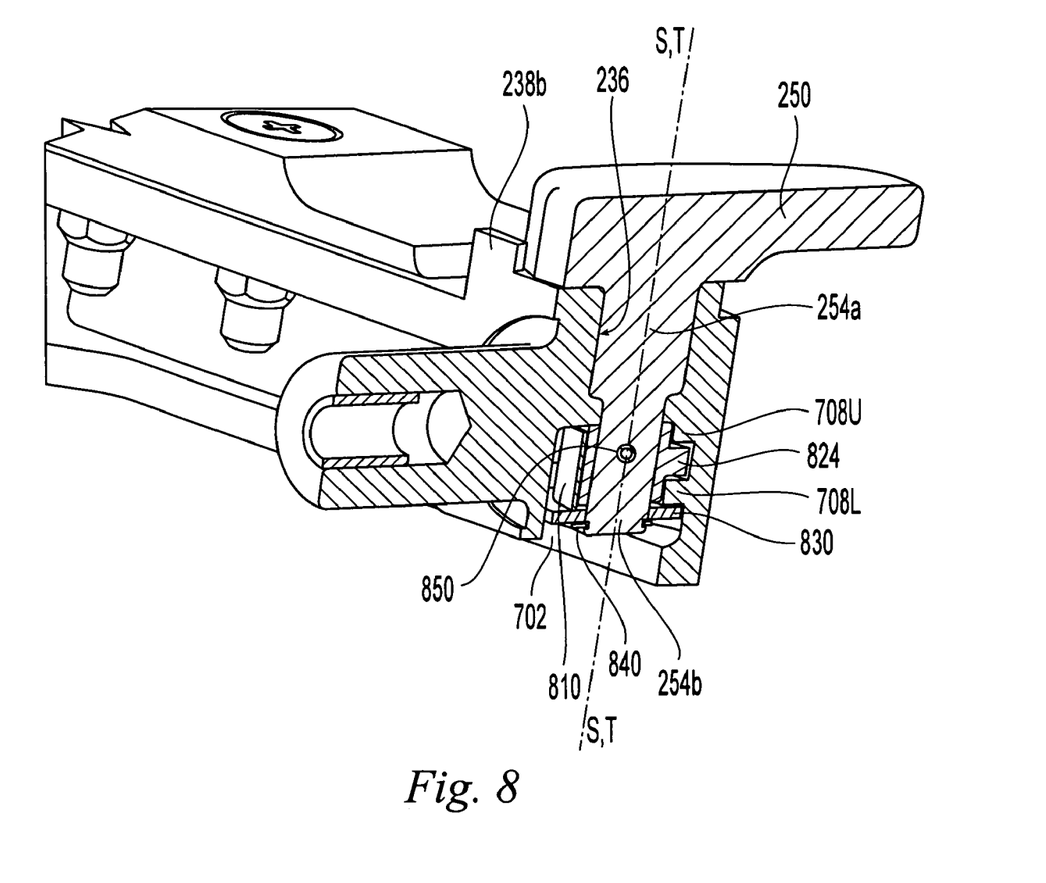
FIG. 8 shows a cutaway view of the assembled vertical restraint and guide rail assembly of FIG. 3 along lines 8-8.

Turning now to FIGS. 7 and 8, the housing 224 has a lower opening 702 formed in its lower surface 704. The lower opening 702 and the upper opening 236 communicate with one another via the housing bore 237.

Figure 7A:
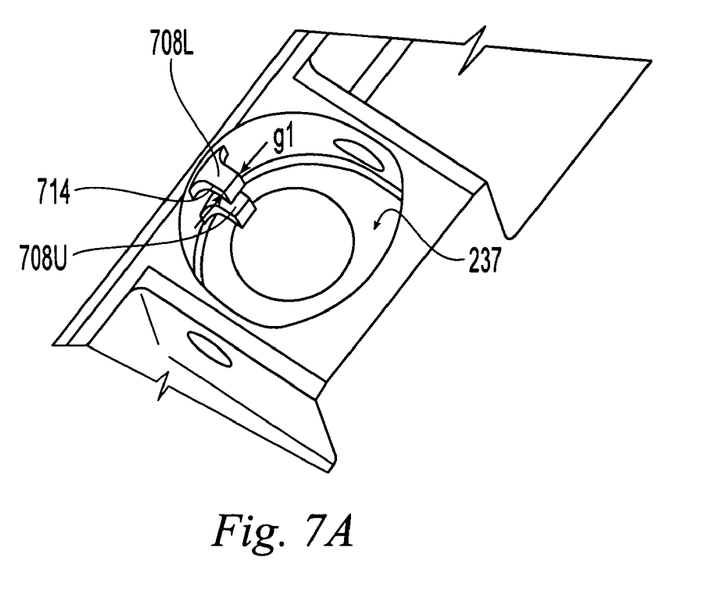
FIG. 7A shows a detailed view of a portion of FIG. 7.

Viewed via the lower opening 702, the housing bore 237 has an inner side wall 706 provided with a pair of axially spaced apart spring actuation bosses 708U, 708L. The bosses and the side wall 706 have unitary construction, being formed of the same block of material. The bosses 708U, 708L are circumferentially located near the front of the vertical restraint support bracket 220, on the side opposite the handle 226. The bosses 708U, 708L are circumferentially aligned with one another, and each has a pair of circumferentially directed abutment surfaces 714 which face in opposite directions, the circumferential thickness of each boss at the circumferentially directed abutment surface 714 being some predetermined thickness g1.

The central portions of the two outer lateral surfaces 710 of the housing 224 are provided with aligned lateral through bores 712 whose purpose will be described further below.

The vertical restraint member 250 is returned to its neutral position by means of a centering assembly 900, seen in FIG. 2. As further seen in FIGS. 9A, 9B, 10 and 11, the centering assembly includes a leaf spring 810, a leaf spring actuator 820, a spring retainer 830 and a retaining ring 840.

Figure 9A:
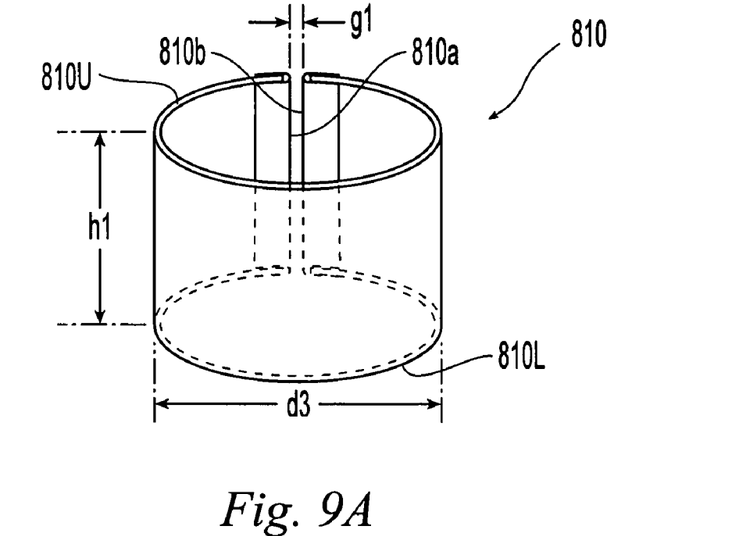
FIG. 9A shows a perspective view of a leaf spring.

As seen in FIG. 9A, the leaf spring 810 has a substantially cylindrical shell shape with a height of h1. The leaf spring 810 comprises a top rim 810U axially spaced apart from, and parallel to, a bottom rim 810L. The leaf spring 810 further comprises a pair of side edges 810A, 810B which face in opposite directions. The leaf spring is of the typical construction and preferably comprises a plurality of layers of thin metal strips (not shown) that are abutted against one another, with the innermost layer extending past, and then wrapping back over the ends of the other layers. That potion of the innermost layer that wraps back forms the aforementioned side edges.

The circumferentially directed abutment surface 714 of the axially spaced apart bosses 708U, 708L serve as stops for opposing side edges 810A, 810B of the leaf spring 810. When the leaf spring 810 is positioned in the housing bore 237, one side edge 810A abuts a first set of circumferentially directed abutment surfaces 714 belonging to the upper and lower bosses, 708U, 708L, this first set facing in a first circumferential direction. Meanwhile, the other side edge 810B abuts the second set of circumferentially directed abutment surfaces 714 belonging to the upper and lower bosses, 708U, 708L, this second set facing in a second, opposite circumferential direction. Under these conditions, the opposing side edges 810A, 810B of the leaf spring 810 are separated by gap g1, which corresponds to the circumferential thickness of the bosses 708U, 708L at their circumferentially directed abutment surfaces 714. When the leaf spring's side edges 810A, 810B abut the circumferentially directed abutment surfaces 714 of the bosses, the leaf spring 810 assumes a third diameter d3.

It should be noted here that the leaf spring 810 in FIG. 9A is depicted in the state that it would occupy, if its opposing edges 810A, 810B were in abutment with the bosses 708U, 708L (and thus spaced apart by g1). It is understood, however, that when the leaf spring is at rest and its edges 810A, 810B do not abut the bosses 708U, 708L, the gap between the edges 810A, 810B would be reduced or eliminated and the diameter d3 would be somewhat diminished.

Figure 9B:
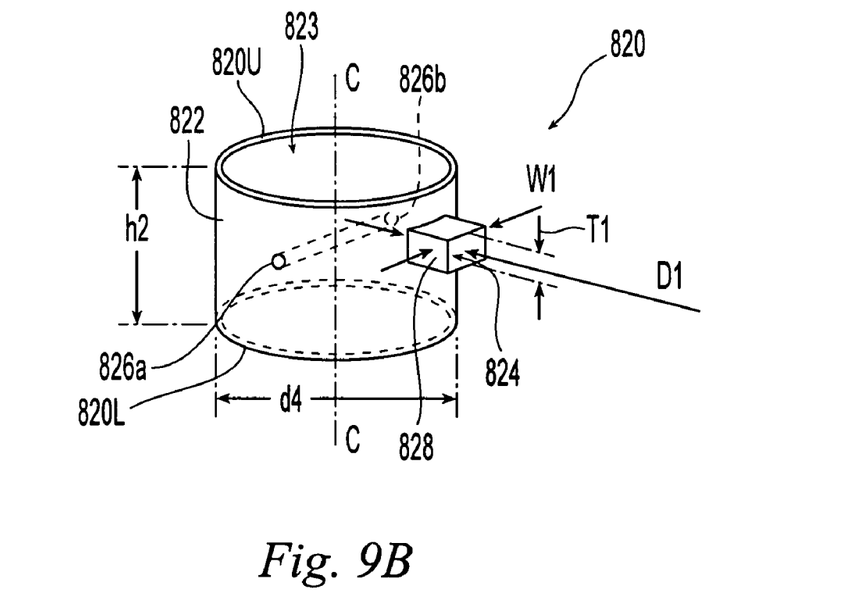
FIG. 9B shows a perspective view of a leaf spring actuator.

As seen in FIG. 9B, the leaf spring actuator 820 has a substantially cylindrical wall 822 enclosing a central cylindrical space 823. The leaf spring actuator 820 has a central axis C, a height of h2, and an outer diameter of d4. The outer diameter d4 of the leaf spring actuator 820 is smaller than the aforementioned first diameter d3 of the leaf spring 810, and so the leaf spring actuator 820 can nest in the leaf spring 810. An inner diameter of the leaf spring actuator 820 is larger than the second diameter d2 of the cylindrical stem portion 254B and so the cylindrical stem portion 254B can nest in the leaf spring actuator 820.

The leaf spring actuator 820 also comprises a top rim 820U axially spaced apart from, and parallel to, a bottom rim 820L. The outer surface of the cylindrical wall 822 of the leaf spring actuator 820 is provided with an actuating arm 824 that projects in a radially outward direction. The actuating arm 824 has a thickness T1, a circumferential width of W1 and a depth D1.

As seen in FIG. 8, when the vertical restraining member 250 is in its neutral position, the actuating arm 824 is located, in the vertical direction, between the axially spaced apart bosses 708U, 708L. To facilitate free circumferential movement of the actuating arm 824 between the bosses 708U, 708L, the thickness T1 of the actuating arm 824 should be less than the axial spacing between the two bosses 708U, 708L. Furthermore, to ensure that the actuating arm 824 does not abut the side edges 810A, 810B of the leaf spring 810 when the vertical restraining member 250 is in its neutral position, the circumferential width W1 of the actuating arm 824 should be less than the circumferential thickness g1 of the bosses.

Returning to FIG. 9B, the outer cylindrical wall 822 of the leaf spring actuator 820 is further provided with a pair of through holes 826A, 826B. The through holes 826A, 826B are located diametrically across from each other and are both circumferentially 90° apart from the circumferential center of the actuating arm 824. Thus, the through holes 826A, 826B are arranged along a first imaginary line that passes through the central axis C, the first imaginary line being perpendicular to a second imaginary line that passes from the circumferential center of the actuating arm 824 through the central axis C. The through holes 826A, 826B of the leaf spring actuator 820 have a diameter sufficient to receive a shear pin 850 (FIG. 2 and FIG. 8).

Assembly is described next. The shaft 254 of the vertical restraint member 250 is receivable into the housing bore 237 of the cargo vertical restraint support bracket 220. During assembly, the restraint shaft 254 is introduced into the housing bore 237 via the upper opening 236. The leaf spring actuator 820 is then inserted into housing bore 237 via the lower opening 702. During this process, the cylindrical stem portion 254B of the restraint shaft 254 enters the central cylindrical space 823 of the leaf spring actuator 820. The leaf spring actuator 820 and the restraint shaft 254 are rotated relative to one another so that the transverse through bore 254C of the cylindrical stem portion 254B is aligned with the through holes 826A, 826B of the leaf spring actuator 820. Both of these are then aligned with lateral through bores 712 formed in the outer lateral surfaces of the housing 224. In this position, the actuating arm 824 of the leaf spring actuator 820 is positioned between the upper and lower bosses 708U, 708L. The shear pin 850 is then inserted, via the lateral through bores 712 of the housing 224, through both the transverse through bore 254C and the through holes 826A, 826B. This ensures that the leaf spring actuator 820 and the vertical restraint member 250 will thereafter rotate together.

Figure 10:
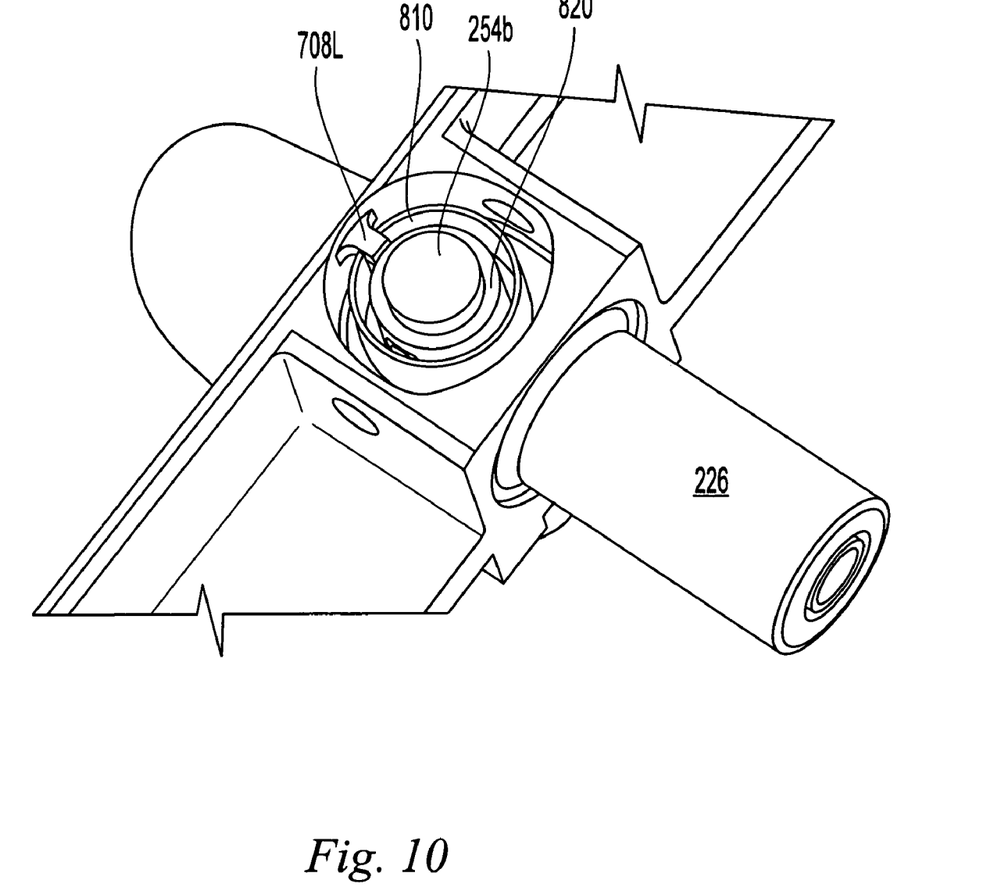
FIG. 10 shows a bottom view of a partially assembled vertical restraint and guide rail assembly presenting the leaf spring in position.

Next, the leaf spring 810 is inserted via the lower opening 702 and positioned around the leaf spring actuator 820 such that the side edges 810A, 810B of the leaf spring 810 abut the circumferentially directed abutment surfaces 714 of the bosses 708U, 708L, as seen in FIG. 10.

Figure 11:
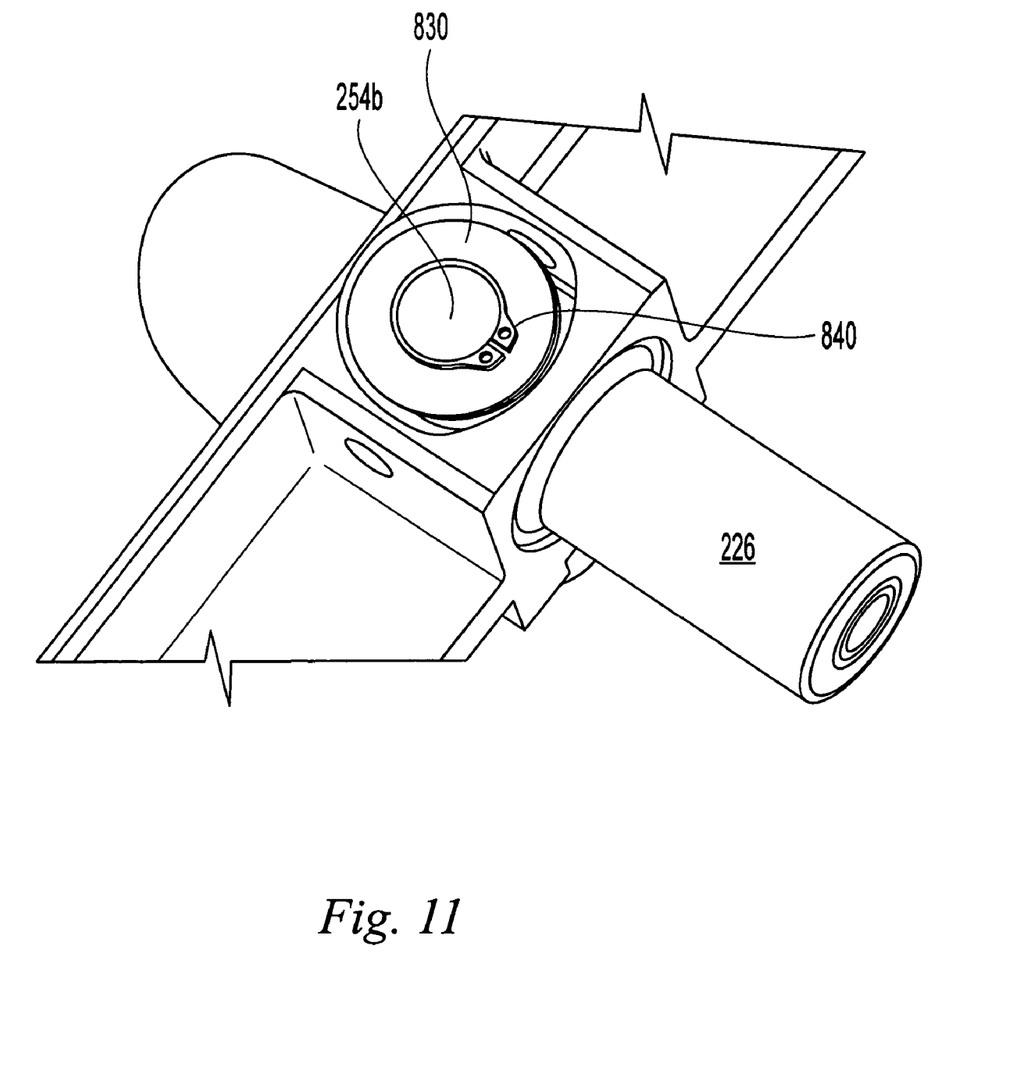
FIG. 11 shows a bottom view of an assembled vertical restraint and guide rail assembly presenting the spring retainer and the retaining ring in position.

Then, as seen in FIG. 11, after the leaf spring 810 has been positioned around the leaf spring actuator 820, a spring retainer 830 in the shape of a flat disk is inserted via the lower opening 702 to help prevent the leaf spring 810 from moving in an axial direction within the housing bore 237. A retaining ring 840 is then inserted via the lower opening 702 to secure the spring retainer 830 in place.

When assembly is complete, forced rotation of the restraint head 250 in a first rotational direction (either clockwise or counter-clockwise) turns the cylindrical stem 254B in that direction. And since the cylindrical stem 254B is fixed relative to the leaf spring actuator 820 by the shear pin 850, rotation of the restraint head 250 results in rotation of the leaf spring actuator 820 in that same direction. When the leaf spring actuator 820 rotates, a side surface 828 of its actuating arm 824 abuts and pushes against a corresponding side edge 810A, 810B of the leaf spring 810, compressing the latter and thus creating a resisting force.

While the present invention has been described herein above in connection with a plurality of aspects and embodiments, it is understood that these aspects and embodiments were presented by way of example with no intention of limiting the invention. Accordingly, the present invention should not be limited to any specific embodiment or aspect, but rather construed in breadth and broad scope in accordance with the recitation of the claims appended hereto.

What is claimed is:

1. An air cargo vertical restraint assembly comprising:
   a vertical restraint support bracket comprising:
      a handle member having a handle axis (H); and
      a housing connected to the handle member, the housing comprising an upper surface having an upper opening therein, the upper opening leading to a housing bore extending along a housing bore axis (T); wherein:
      a rear portion of the housing upper surface is provided with a pair of spaced apart stops; and
      a side wall of the housing bore is provided with a pair of spaced apart bosses; and
   a vertical restraint member comprising:
      a head portion having a first longitudinal axis (A); and
      a shaft connected to the head portion, the shaft having a second longitudinal axis (S) that intersects the first longitudinal axis; wherein:
      the head portion has a forwardmost portion that is laterally offset from the first longitudinal axis; and
      a bottom surface of the head portion is convex, symmetrically curved about the first longitudinal axis and has a lowest point that is horizontally aligned with said first longitudinal axis;
   wherein:
   the vertical restraint member is configured to be received into the housing bore of the vertical restraint support bracket.

2. The air cargo vertical restraint assembly according to claim 1, wherein the vertical restraint member is retained in the housing bore of the vertical restraint support bracket.

3. The air cargo vertical restraint assembly according to claim 2, further comprising:
   an actuator mounted on the shaft of the vertical restraint member and located within the housing bore, the actuator having a radially outwardly projecting arm that extends into a space between the pair of bosses.

4. The air cargo vertical restraint assembly according to claim 3, further comprising:
   a leaf spring positioned around the actuator, the leaf spring having a pair of edges facing in opposite circumferential directions, each of the opposing edges of the leaf spring abutting at least one circumferentially directed abutment formed on each of the bosses.

5. The air cargo vertical restraint assembly according to claim 4, wherein, upon rotation of the vertical restraint member, the actuator's radially outwardly projecting arm abuts and pushes against one of the pair of edges of the leaf spring.

6. The air cargo vertical restraint assembly according to claim 5, wherein, upon rotation of the vertical restraint member to a predetermined position, an abutment wall belonging to a cutout formed on the underside of the head portion of the vertical restraint member abuts one of said stops.

7. An air cargo vertical restraint assembly comprising:
   a vertical restraint support bracket comprising:
      a handle member having a handle axis (H); and
      a housing connected to the handle member, the housing comprising an upper surface having an upper opening therein, the upper opening leading to a housing bore extending along a housing bore axis (T); wherein:
      a rear portion of the housing upper surface is provided with a pair of spaced apart stops; and
      a side wall of the housing bore is provided with a pair of spaced apart bosses; and
   a vertical restraint member comprising:
      a head portion having a first longitudinal axis (A); and
      a shaft connected to the head portion, the shaft having a second longitudinal axis (S) that intersects the first longitudinal axis
   wherein:
   the vertical restraint member is configured to be received into the housing bore of the vertical restraint support bracket.

8. An air cargo vertical restraint support bracket having single piece construction and comprising:
- a handle member having a handle axis (H);
- a housing connected to the handle member, the housing comprising an upper surface having an upper opening therein, the upper opening leading to a housing bore extending along a housing bore axis (T) which is transverse to the handle axis (H); and
- first and second securing wings extending from opposite lateral sides of the housing; wherein:
- a side wall of the housing bore is provided with a pair of spaced apart bosses.

9. The air cargo vertical restraint assembly according to claim 7, wherein the vertical restraint member is retained in the housing bore of the vertical restraint support bracket.

10. The air cargo vertical restraint assembly according to claim 9, futher comprising:
- an actuator mounted on the shaft of the vertical restraint member and located within the housing bore, the actuator having a radially outwardly projecting arm that extends into a space between the pair of bosses.

11. The air cargo vertical restraint assembly according to claim 10, further comprising:
- a leaf spring positioned around the actuator, the leaf spring having a pair of edges facing in opposite circumferential directions, each of the opposing edges of the leaf spring abutting at least one circumferentially directed abutment formed on each of the bosses.

12. The air cargo vertical restraint assembly according to claim 11, wherein, upon rotation of the vertical restraint member, the actuator's radially outwardly projecting arm abuts and pushes against one of the pair of edges of the leaf spring.

13. The air cargo vertical restraint assembly according to claim 12, wherein, upon rotation of the vertical restraint member to a predetermined position, an abutment wall belonging to a cutout formed on the underside of the head portion of the vertical restraint member abuts one of said stops.

14. An air cargo vertical restraint member having a pivot point, and comprising:
- a head portion having an upper surface visible in a top view of the vertical restraint member, and a first longitudinal axis (A) which, in said top view, passes through said pivot point and extends along the upper surface of the head portion; and
- a shaft connected to the head portion, the shaft having a second longitudinal axis (S) that intersects the first longitudinal axis; wherein:
- in said top view, the head portion is asymmetric about the first longitudinal axis and has a forwardmost portion that is laterally offset from the first longitudinal axis.

15. The air cargo vertical restraint member according to claim 14, wherein the member comprises a single piece of machined stainless steel.

16. The air cargo vertical restraint member according to claim 14, wherein:
- the shaft comprises a base portion having a first diameter, the base portion being connected to and coaxial with a stem portion having a second diameter, the second diameter being smaller than the first diameter.

17. The air cargo vertical restraint member according to claim 16, wherein the stem portion has a transverse through bore which is oriented substantially perpendicularly to both the first longitudinal axis and also to the second longitudinal axis.

18. The air cargo vertical restraint member according to claim 14, wherein:
- the head portion has an underside provided with a first cutout formed on a first side of the shaft and a second cutout formed on a second side of the shaft; and
- each of the cutouts comprises a laterally facing abutment wall.

19. The air cargo vertical restraint member according to claim 14, wherein, in a front view, a bottom surface of the head portion is convex, symmetrically curved about the first longitudinal axis and has a lowest point that is horizontally aligned with said first longitudinal axis.

20. An air cargo vertical restraint member having a pivot point, and comprising:
- a head portion having an upper surface visible in a top view of the vertical restraint member, and a first longitudinal axis (A) which, in said top view, passes through said pivot point and extends along the upper surface of the head portion; and
- a shaft connected to the head portion, the shaft having a second longitudinal axis (S) that intersects the first longitudinal axis;

wherein:
- a bottom surface of the head portion is shaped to restrain a unit load device;
- in a front view of the vertical restraint member, the bottom surface of the head portion is convex, symmetrically curved about the first longitudinal axis and has a lowest point that is horizontally aligned with said first longitudinal axis; and
- the vertical restraint member has single piece construction.

21. An air cargo vertical restraint support bracket having single piece construction and comprising:
- a handle member having a handle axis (H);
- a housing connected to the handle member, the housing comprising an upper surface having an upper opening therein, the upper opening leading to a housing bore extending along a housing bore axis (T) which is transverse to the handle axis (H); and
- first and second securing wings extending from opposite lateral sides of the housing; wherein:
- a rear portion of the housing upper surface is provided with a pair of spaced apart stops.

22. The air cargo vertical restraint support bracket according to claim 21, wherein:
- one of said pair of stops is located on either side of the upper opening at the rear portion of the housing upper surface.

23. The air cargo vertical restraint support bracket according to claim 21, wherein:
- a side wall of the housing bore is provided with a pair of spaced apart bosses.

24. The air cargo vertical restraint support bracket according to claim 23, wherein:
- the bosses and the side wall of the housing bore have single piece construction.

25. The air cargo vertical restraint support bracket according to claim 23, wherein:
- the pair of bosses are axially spaced apart along the housing bore axis;
- the pair of bosses are circumferentially aligned with one another along the housing bore axis; and
- each of the bosses has a pair of circumferentially directed abutment surfaces which face in opposite circumferential directions.

26. The air cargo vertical restraint support bracket according to claim 23, wherein:

the pair of bosses are axially spaced apart along the housing bore axis.

27. The air cargo vertical restraint support bracket according to claim 23, wherein:

the pair of bosses are circumferentially aligned with one another along the housing bore axis.

28. The air cargo vertical restraint support bracket according to claim 23, wherein:

each of the bosses has a pair of circumferentially directed abutment surfaces which face in opposite circumferential directions.

29. The air cargo vertical restraint support bracket according to claim 8, wherein:

each of the bosses has a pair of circumferentially directed abutment surfaces which face in opposite circumferential directions.

30. The air cargo vertical restraint support bracket according to claim 8, wherein:

the pair of bosses and the side wall of the housing bore have single piece construction.

31. The air cargo vertical restraint support bracket according to claim 8, wherein:

the pair of bosses are axially spaced apart along the housing bore axis;

the pair of bosses are circumferentially aligned with one another along the housing bore axis; and each of the bosses has a pair of circumferentially directed abutment surfaces which face in opposite circumferential directions.

32. The air cargo vertical restraint support bracket according to claim 8, wherein:

the pair of bosses are axially spaced apart along the housing bore axis.

33. The air cargo vertical restraint support bracket according to claim 8, wherein:

the pair of bosses are circumferentially aligned with one another along the housing bore axis.

\* \* \* \* \*